United States Patent [19]
Jirele

[11] 4,019,233
[45] Apr. 26, 1977

[54] PULLER APPARATUS AND METHOD FOR DISASSEMBLING UNIVERSAL JOINTS

[75] Inventor: James E. Jirele, Owatoona, Minn.

[73] Assignee: Owatonna Tool Company, Owatonna, Minn.

[22] Filed: May 7, 1975

[21] Appl. No.: 575,470

[52] U.S. Cl. .................................................. 29/261
[51] Int. Cl.[2] .......................................... B23P 19/04
[58] Field of Search ............ 29/261, 262, 257, 259, 29/201 D

[56] References Cited

UNITED STATES PATENTS

| | | | |
|---|---|---|---|
| 1,648,106 | 11/1927 | Brewer | 29/261 |
| 1,709,913 | 4/1929 | Kaplan | 29/261 |
| 2,096,345 | 10/1937 | Schrem | 29/261 |
| 2,360,781 | 10/1944 | McGinnis et al. | 29/261 |
| 3,076,259 | 2/1963 | Stebbins | 29/259 |
| 3,846,891 | 11/1974 | Elg | 29/257 |

*Primary Examiner*—James L. Jones, Jr.
*Attorney, Agent, or Firm*—Wegner, Stellman, McCord, Wiles & Wood

[57] ABSTRACT

A puller apparatus and method for disassembling a universal joint which has a cruciform spider and two yokes each of which has collars that carry bearing cups mounted upon the opposite arms of the spider. Integral flanges on the cups prevent them from being pulled through the collars. A puller bridge assembly has studs which extend loosely through holes in the cup flange and are screwed into threaded bores in a first collar of the first yoke; and side plates are mounted on the collars of the second yoke. Puller means has a cross head with puller arms that engage the side plates and a driver screw that bears on the bridge plate so that turning the screw separates the first yoke from the first cup. The bridge assembly and puller means are then repositioned and used to remove the second cup from the first yoke, after which the first yoke is removed. The side plates are then removed, journal caps are placed upon the arms from which the first yoke was removed; and the bridge assembly and puller means, with the arms engaging the journal caps, are used to successively remove the cups from the second yoke.

8 Claims, 5 Drawing Figures

PULLER APPARATUS AND METHOD FOR DISASSEMBLING UNIVERSAL JOINTS

BACKGROUND OF THE INVENTION

One type of universal joint for motor vehicles uses bearing cups which have integral flanges that prevent them from being pulled through the collars of the yokes in which they are supported; and disassembly of such universal joints is a very difficult operation. The bearing cups are fastened to the collars by means of flanged screws which extend through holes in the bearing cup flanges and into threaded bores in the yoke collars. Even after the flanged bolts are removed, the bearing cups are tightly held in the yoke collars, and it is difficult to get either a pulling or a prying tool between the cup flange and the yoke collar to lift the cup out of the collar. A prior art patent which has certain features that are similar to the structure of the present invention is Stebbins U.S. Pat. No. 3,076,259. However, the Stebbins structure cannot be used to remove a flanged bearing cup from a universal joint yoke; and in addition the structure is such that it can be used only to remove bearing cups from a second yoke of a universal joint after the first yoke has already been removed in another way.

Recently issued Elg U.S. Pat. No. 3,845,891 shows apparatus for removing a flanged cup bearing.

SUMMARY OF THE INVENTION

In accordance with the present invention, a puller assembly includes a bridge assembly, side plates, and a puller means which cooperates with the bridge assembly and the side plates during removal of the bearing cups from the collars of a first universal joint yoke. The apparatus also includes a pair of journal caps which are used on the spider arms from which the first yoke has been removed, and which cooperates with the puller means during removal of the bearing cups from the second yoke in much the same way that the side plates cooperate with the puller means during removal of the cups from the first yoke.

Specifically, the bridge assembly includes a pair of shoulder studs which loosely impale the holes in a bearing cup flange and are screwed into the bores in the yoke collar from which the cup retaining headed bolts have been removed. A bridge plate is secured to the outer ends of the shoulder studs in spaced relationship to the cup flange. The side plates, heretofore referred to, are secured by means of screws which engage the threaded bores of the second yoke collars. The side plates have outwardly projecting coaxial bosses which are rotatable to permit proper alignment.

The puller means includes a cross head and links which pivotally mount a pair of puller arms that have hooked free ends to engage the projecting bosses on the side plates. The cross head has a threaded hole in which a driver screw is mounted, and the driver screw bears upon the bridge plate when the puller arms are engaged with the side plates. Turning the driver screw forces the bridge assembly and the first yoke bodily away from the cross head, while the spider and the bearing cup are held in a fixed position relative to the driver screw, so the first yoke is pushed off of the first bearing cup so that the latter may be removed. The process is repeated for the second bearing cup in the first yoke, and the first yoke is removed from the spider.

The side plates are then removed from the second yoke, and the journal caps are mounted upon the spider arms from which the first yoke and the first bearing cups have been removed. The bridge assembly and puller means are then used, successively, to remove the bearing caps from the second yoke, with the puller arms hooking under the journal caps during this operation.

The principal object of the present invention, therefore, is to provide a puller assembly which can be used to remove the flanged bearing cups successively from both yokes of a universal joint.

Still another object of the invention is to provide a puller assembly which has a bridge plate and side plates provided with patterns of holes which permit them to be mounted upon universal joints of several different sizes.

THE DRAWINGS

DETAILED DESCRIPTION OF THE INVENTION

Figure 1:
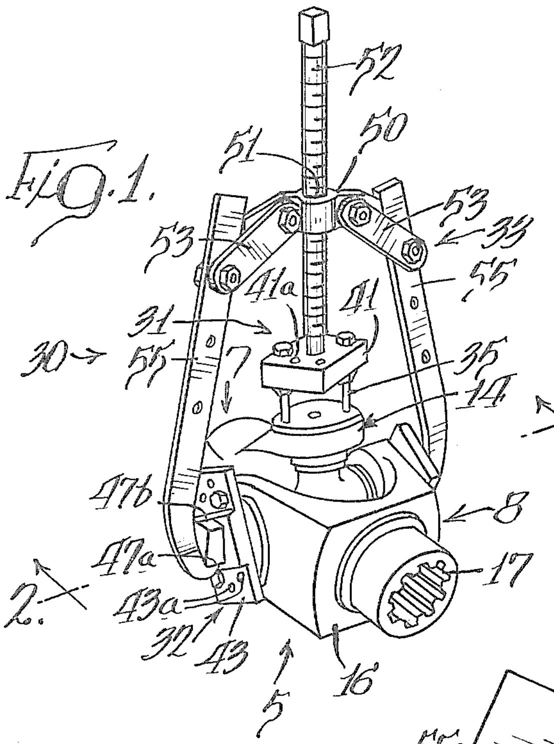
FIG. 1 is a perspective view of a universal joint with the puller assembly in place for removal of the first bearing cup from the first yoke.
Figure 2A:
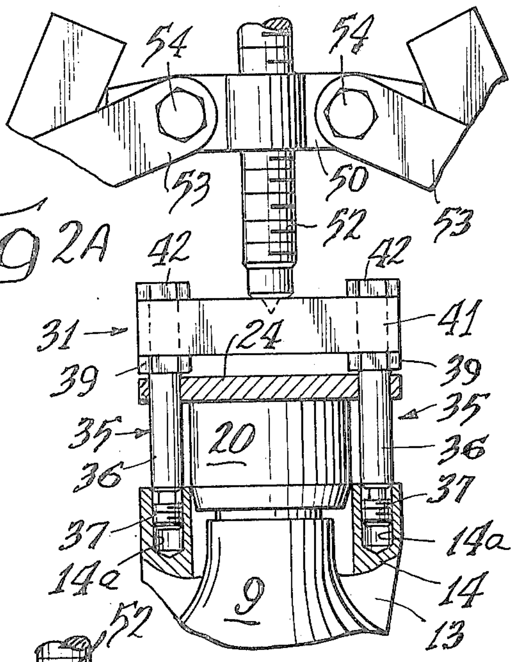
FIG. 2A is a fragmentary view of a part of the structure shown in FIG. 2 and with parts of the universal joint disassembled.
Figure 2:
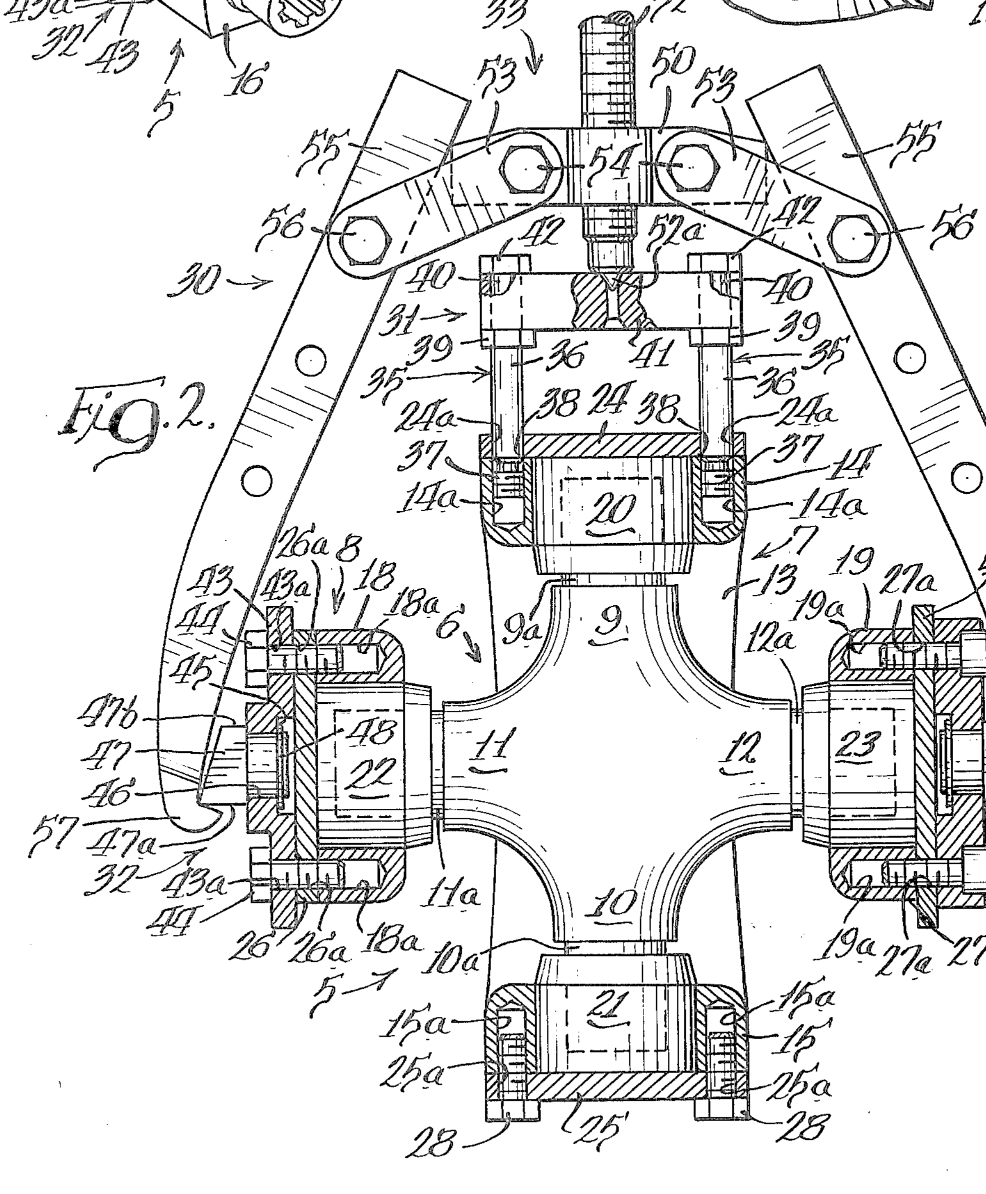
FIG. 2 is a fragmentary sectional view on an enlarged scale taken substantially as illustrated along the line 2—2 of FIG. 1.

Referring to the drawings, and referring first to FIGS. 1 and 2, a universal joint, indicated generally at 5, includes a cruciform spider, indicated generally at 6, a first yoke, indicated generally at 7, and a second yoke, indicated generally at 8. The cruciform spider has opposed first and second arms 9 and 10, and opposed third and fourth arms 11 and 12, and each arm has a reduced end portion (9*a*, 10*a*, 11*a*, and 12*a*) which provides a journal.

The yoke 7 has an arcuate body 13 which is provided with a splined hollow boss (not shown) and the yoke also has arms that terminate in mounting collars 14 and 15. The second yoke 8 is identical with the yoke 7, and includes a bight 16 having a splined hollow boss 17, and arms which provide collars 18 and 19.

Surrounding each of the journal portions of the spider arms is a bearing cup which is carried in an associated yoke collar. A first bearing cup 20 is mounted in the first collar 14 of the first yoke 7, and a second bearing cup 21 is mounted in the second collar 15 of the first yoke 7. Similarly, a third bearing cup 22 is mounted in the first collar 18 of the second yoke 8, and a fourth bearing cup 23 is mounted in the second collar 19 of the second yoke 8. The bearing cups 20, 21, 22, and 23 are provided, respectively, with welded-on flanges 24, 25, 26 and 27 which have peripheral portions overlying the respective collars 14, 15, 18 and 19. Each of the yoke collars has a pair of threaded bores, the bores in the collar 14 being 14*a*, those in the collar 15 being 15*a*, those in the collar 18 being 18*a*, and those in the collar 19 being 19*a*. Aligned with the aforesaid threaded bores in the yoke collars are holes 24*a*, 25*a*, 26*a*, and 27*a* in the respective cup flanges 24, 25, 26 and 27. When the universal joint is assembled, a pair of headed bolts, such as the bolts 28 seen at the bottom of FIG. 2, impale the holes in all of the bearing cup flanges and screw into the threaded bores in the yoke collars. As shown in the drawings, the bolts such as the bolts 28 are removed from the universal joint before it is disassembled in order that the bridge assembly and the side plates of the puller apparatus may be mounted.

Figure 3:
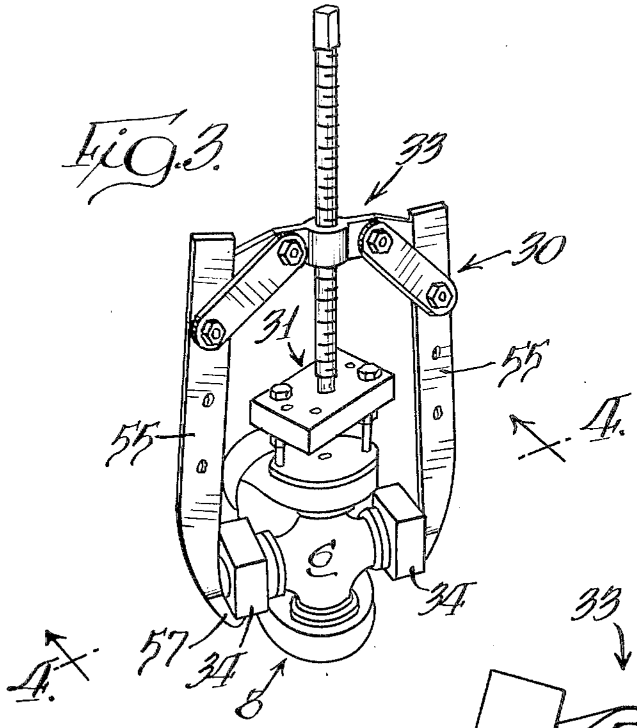
FIG. 3 is a view similar to FIG. 1, illustrating the puller assembly positioned to remove the third bearing cup from the second yoke, after the first yoke has been removed.
Figure 4:
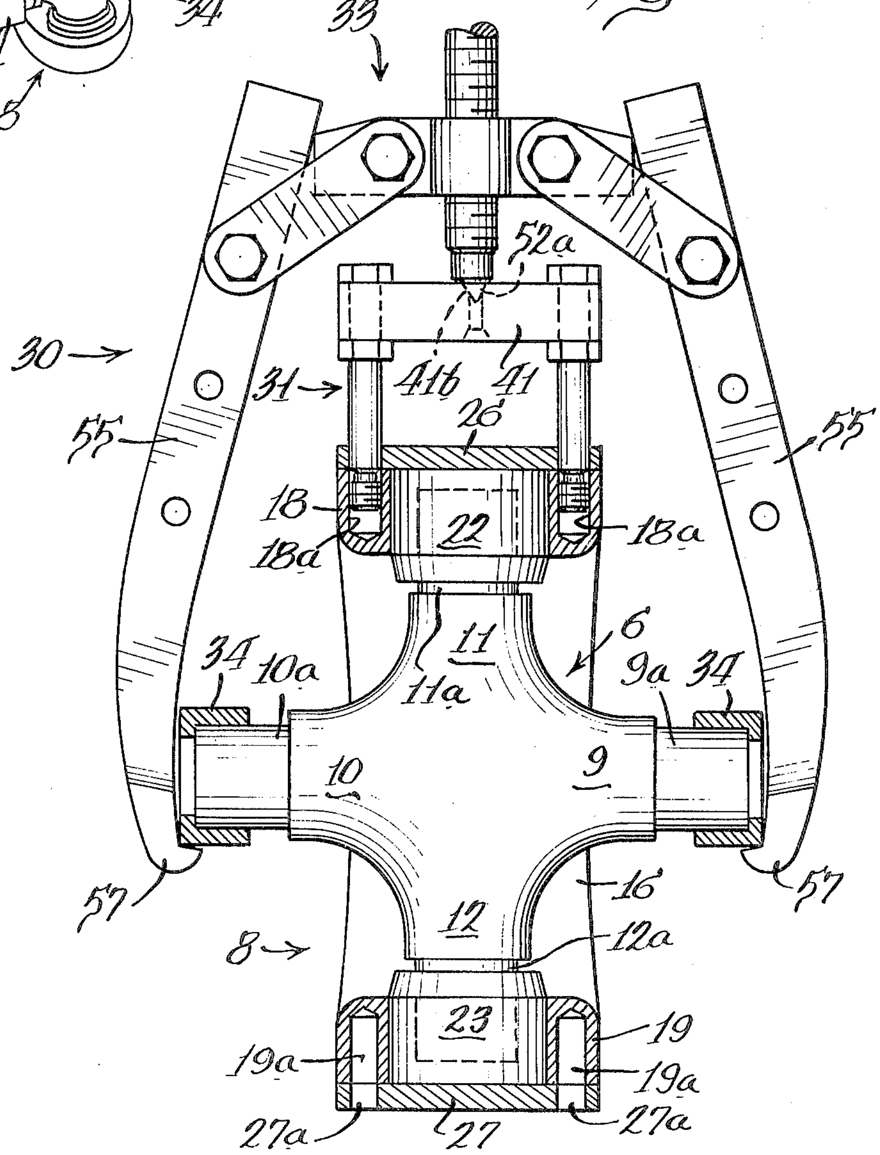
FIG. 4 is a fragmentary sectional view on an enlarged scale taken substantially as indicated along the line 4—4 of FIG. 3.

The puller apparatus of the present invention, indicated generally at 30, is seen to include a bridge assembly, indicated generally at 31; side plates, indicated generally at 32 which are seen only in FIGS. 1 and 2; a puller assembly, indicated generally at 33; and a pair of journal caps 34 which are seen only in FIGS. 3 and 4.

The bridge assembly 31 consists of a pair of studs 35, each of which has a shank 36 that loosely impales the holes in the bearing cup flanges, a threaded distal end portion 37 which is separated by a first shoulder 38 from the shank 36, a second shoulder 39, and a threaded proximal end portion 40. The studs 35 are screwed into the threaded bores of a yoke collar (the collar 14 in FIG. 2 or the collar 18 in FIG. 4), and a bridge plate 41 has a pair of holes impaled by the threaded proximal ends 40 of the studs 35. Nuts 42 clamp the bridge plate 41 against the second shoulders 39 of the studs.

As seen in FIG. 1, the bridge plate 41 has several holes 41*a*, and two of those holes are impaled by the proximal ends 40 of the studs 35. The distribution of the holes 41*a* is such that regardless of which of several sizes of universal joint is being disassembled, a pair of the holes 41*a* may be aligned with the studs 35, the spacing of which differs when assembled with universal joints of different sizes.

Each of the side plates 32 has a body 43 with holes 43*a* to receive threaded screws 44 which screw into the threaded yoke collar bores, such as the bores 18*a* and 19*a*. Each side plate also includes a central recess 45 in its rear surface that communicates with a hole 46 of reduced diameter in which a flat-edged boss 47 is removably and rotatably mounted by means of a snap ring 48. As seen in FIG. 2, when the side plates 32 are mounted upon the collars of a yoke, the bosses 47 are coaxial and project outwardly from the side plates; and each has a longer surface 47*a* and a shorter surface 47*b*.

As seen in FIG. 1, the side plates 32 have several holes 43*a* which are so distributed that different pairs of said holes may be aligned with the holes in the bearing cup flanges of the universal joint, depending upon the size of the universal joint.

The puller assembly 33 includes a cross head 50 that has a central threaded bore 51 to receive a driver screw 52 that has a conical tip 52*a*. Links 53 are pivotally mounted on the cross head 50 on bolts 54; and puller arms 55 are pivotally mounted on the free ends of the links 53 by means of bolts 56. The puller arms 55 have free ends that are formed with inturned hooks 57 to engage beneath the longer sides 47*a* of the bosses 47.

In use, the puller assembly 30 is mounted as seen in the drawings, with the hooks 57 of the arms engaged beneath the flat-edged bosses 47 and with the conical tip 52*a* of the driver screw 52 seated in a complementary recess 41*b* in the bridge plate 41. The rotatable adjustment of the bosses 47 permits square alignment with the hooks 57 in any mounting position of the side plates 32. When so mounted, the cross head 50 and the universal joint cruciform spider 6 occupy fixed positions with respect to one another, but the bridge assembly 31 and the first yoke 7 may be moved bodily away from the cross head 50 by rotating the driver screw 52 in the cross head to put a thrust upon the bridge plate 41. The apparatus is assembled as in FIG. 2, for removal of the first bearing cup 20 from the first yoke collar 14.

In operation, rotation of the driver screw 52 exerts a downward force on the bridge assembly 31 and an upward pull on the bosses 47. The bridge assembly acts through the pair of studs 35 to force the collar 14 downwardly relative to the bearing cup 20 and cup flange 24. The latter parts are held on the reduced end portion 9a of the spider arm 9 which is connected to the bosses 47. Thus, as shown in FIG. 2A, there is a relative movement between the collar 14 and the bearing cup 20 to release the bearing cup from the collar.

The puller assembly 33 and the bridge assembly 31 are then demounted, the bridge assembly is remounted upon the second yoke collar 15 with the studs 35 replacing the shoulder screws 28, the bosses 47 are rotated 180° to place their long sides 47*a* away from the bridge assembly, and the puller assembly is remounted and utilized to separate the second bearing cup 21 from the second yoke collar 15. In separating the second bearing cup 21, the action is the same as described above in connection with bearing cup 20, with the collar 15 being relatively advanced toward the center of the spider 6, while the bearing cup 21 remains stationary. This permits the first yoke 7 to be removed from the spider, thus exposing the journals 9*a* and 10*a* of the spider arms 9 and 10.

The side plates 32 are removed from the collars 18 and 19 of the second yoke 8, and the bridge assembly 31 is mounted as seen in FIG. 4, upon the collar 18 of the second yoke. The journal caps 34 are mounted upon the journals 9*a* and 10*a* as seen in FIG. 3 and 4, and the puller assembly 33 is mounted as seen in FIG. 4 to separate the third bearing cup 22 from the yoke collar 18. With the parts positioned as shown in FIG. 4, the driver screw 52 is rotated to apply equal and opposite forces on the bridge assembly 31 and the puller arms 55. This causes lowering movement of the collar 18 relative to the bearing cup 22 with release of one of these parts from the other.

The puller assembly 33 and the bridge assembly 31 are then demounted and remounted to remove the fourth bearing cup 23 from the second collar 19 of the second yoke 8, and this permits the second yoke to be removed from the spider 6.

In addition to the fact that the bridge plate 41 and the side plates 32 have several holes to accommodate them to universal joints of different sizes, a commercial apparatus constructed in accordance with the invention has journal caps 34, studs 35, and bolts 44 of different sizes to fit the various sizes of universal joints.

The foregoing detailed description is given for clearness of understanding only and no unnecessary limitations should be understood therefrom, as modifications will be obvious to those skilled in the art.

I claim:

1. A puller apparatus for disassembling a universal joint which has a cruciform spider with opposite arms, first and second bearing cups rotatably surrounding the end portions of a first two opposite arms, third and fourth bearing cups rotatably surrounding the end portions of a second two opposite arms, a first yoke which spans the spider and has first and second collars in which the first and second bearing cups are respectively mounted, a second yoke which spans the spider and has third and fourth collars in which the third and fourth bearing cups are respectively mounted, a bearing cup flange integral with each bearing cup and overlying the associated yoke collar, and headed bolts which impale holes in each of said flanges and screw into threaded bores in the yoke collars, said puller apparatus comprising, in combination:

a bridge assembly that includes a bridge plate mounted upon studs which loosely impale the holes in the first bearing cup flange when the headed bolts are removed, said studs having distal portions seated in the threaded bores in the first collar;

a pair of side plates which are secured, respectively, to the third and fourth collars;

a puller assembly that includes a cross head having a threaded bore, a drive screw threaded through said bore and bearing on the bridge plate, and two puller arms pivotally supported on fixed pivots on said cross head and which have free ends releasably interengaged with the side plates to secure the cross head against movement away from the spider, whereby rotation of the drive screw to apply pushing force to the bridge plate moves said bridge plate and first yoke bodily away from the cross head while the spider and the first bearing cup remain fixed relative to the cross head to separate the bearing cup from the collar; and a pair of journal cap which are adapted to surround the end portions of the first two opposite arms of the spider after the first and second bearing cups and the first yoke have been removed, said caps being adapted to be interengaged with the free ends of the puller arms to permit the bridge assembly and the puller means to be used for removing the third and fourth bearing cups and the second yoke from the spider.

2. The combination of claim 1 in which the studs have shoulders adjacent their proximal ends, the bridge plate has a pair of spaced holes impaled by said proximal ends so the bridge plate seats upon said second shoulders, and the proximal ends are threaded to receive nuts which clamp the bridge plate on the shoulders.

3. The combination of claim 1 in which each side plate has a pair of holes aligned with two holes in a bearing cup flange, and each side plate is secured to the yoke collar by means of screws which enter the threaded bores of said collar.

4. The combination of claim 3 in which the side plates have several holes which are so distributed that different pairs of said several holes may be aligned with two holes in a yoke collar, depending upon the size of the universal joint with which the apparatus is used.

5. The combination of claim 4 in which the side plates have projecting, coaxial bosses rotatably mounted therein and the puller arms have hooks at their free ends which engage said bosses.

6. A puller apparatus for the removal of flanged bearing cups from the yokes of a universal joint, said universal joint being of the type including a pair of yoke members each having a pair of bearing cups mounted in opposed collars thereof and a cruciform spider having four arms adapted to be inserted in said bearing cups, comprising:

first means adapted to be secured to opposed collars of one of said pair of yoke members;

second means adapted to be connected to one collar of the other of said pair of yoke members whose bearing cup is to be removed;

third means comprising a puller with puller arms having free ends for applying equal and opposite forces to said first and second means, such that said spider is moved in a direction to force the bearing cup out of said one collar of said other of said pair of yoke members; and fourth means independent of said first means mountable on two of said spider arms in place of said first means for engagement by the free ends of the puller arms for removal of the bearing cups from said one of said pair of yoke members after separation of the latter yoke member from said other of said pair of yoke members.

7. Apparatus as in claim 6 wherein said first means comprises first and second plates each having a rotatably mounted boss with a flat edge extending from one surface thereof and said plates adapted to be secured to the opposed collars of said one of said pair of yoke members.

8. Apparatus as in claim 6 wherein said fourth means comprises a pair of journal caps each with an opening therein to fit onto one of said arms.

* * * * *